Figure 3:
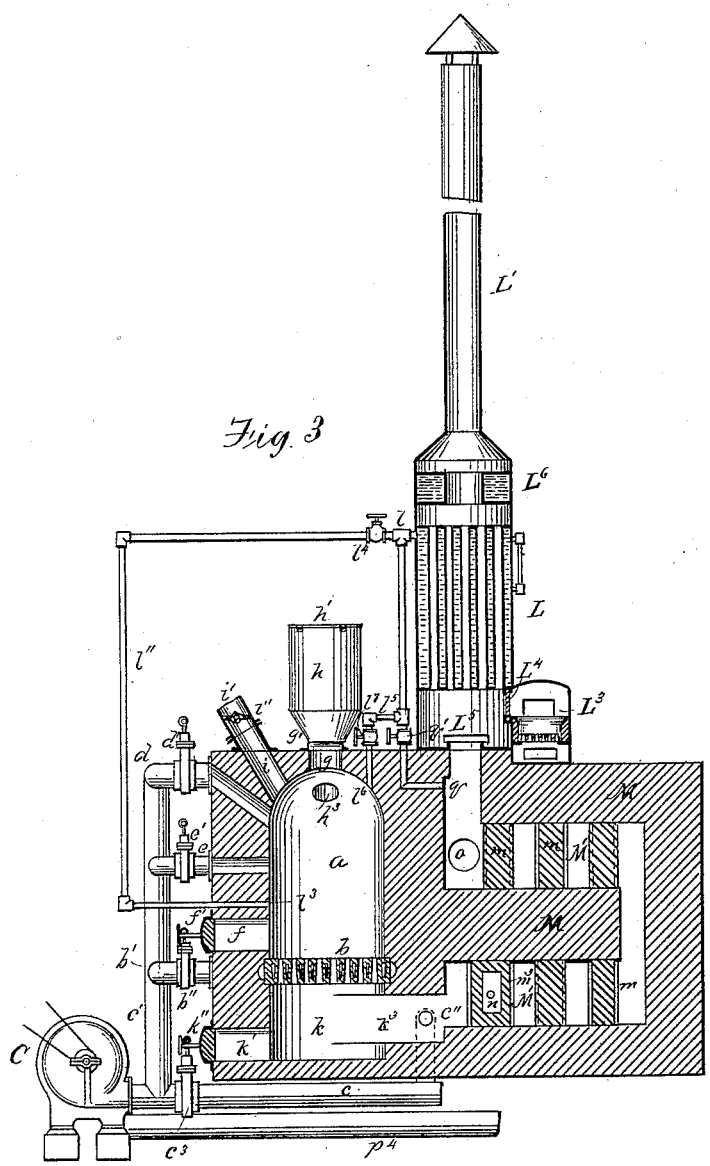

(No Model.)  2 Sheets—Sheet 1.
B. LOOMIS.
PROCESS OF MANUFACTURING GAS.
No. 338,990.  Patented Mar. 30, 1886.
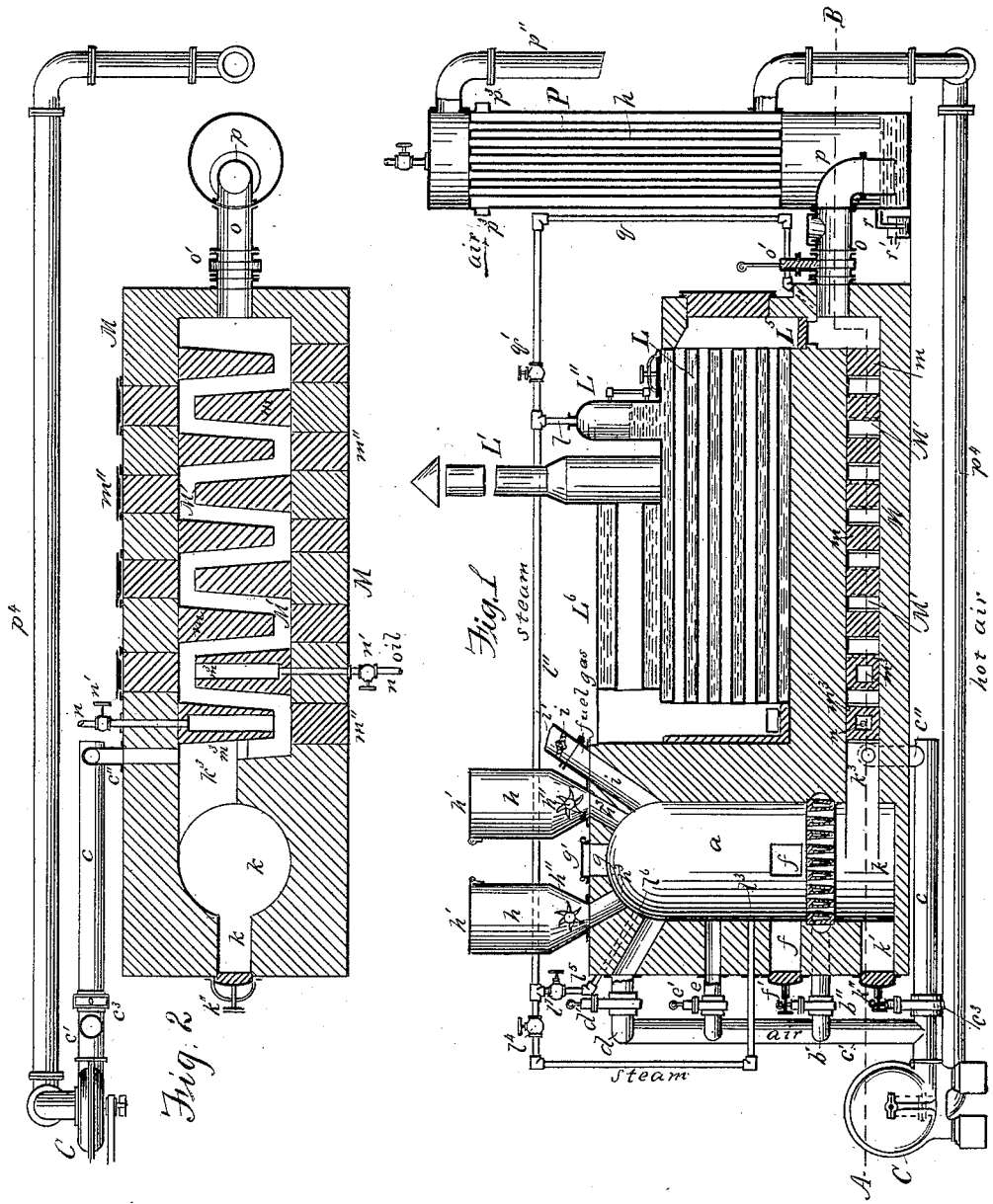
Witnesses
Jas. W. Hatch
Ed. B. Hatch
Inventor
Burdett Loomis (No Model.) 2 Sheets—Sheet 2.

B. LOOMIS.
PROCESS OF MANUFACTURING GAS.

No. 338,990. Patented Mar. 30, 1886.

Witnesses:
Jas. W. Hatch
Ed. B. Hatch

Inventor
Burdett Loomis

UNITED STATES PATENT OFFICE.

BURDETT LOOMIS, OF HARTFORD, CONNECTICUT.

PROCESS OF MANUFACTURING GAS.

SPECIFICATION forming part of Letters Patent No. 338,990, dated March 30, 1886.

Application filed April 22, 1885. Serial No. 163,026. (No model.)

*To all whom it may concern:*

Be it known that I, BURDETT LOOMIS, a citizen of the United States, residing at Hartford, in the county of Hartford and State of Connecticut, have invented certain new and useful Improvements in Process of Manufacturing Gas, of which the following is a specification, reference being had therein to the accompanying drawings.

This invention relates to improvements in the process of manufacturing illuminating-gas in a cupola-generator in connection with a superheating or fixing chamber.

The object of the invention is to improve the operation of coking bituminous coal directly in the cupola by a downward air-blast, and heating such coked coal to a suitable temperature for decomposing steam; to provide for keeping the fuel-chamber clear of clinker and ashes, whereby the steam may be better decomposed, and to keep the ash-pit hot, and thus prevent condensation of steam therein.

Heretofore in manufacturing illuminating-gas an upward air-blast has usually been forced through the fuel in the generator—that is, the air has been forced from the ash-pit up through the grate and coal resting upon it—but such operation is objectionable, as the ashes and clinkers and other incombustible products of the fuel are prevented from passing freely downward through the grate, and thereby cause the latter to become clogged up and an impaired combustion results in the generator. In my process I do just the reverse—that is, I use a downward draft in the generator—by forcing air from the top or sides of the latter through the fuel and through the spaces between the grate-bars, by which I obtain a perfect combustion of the fuel. The ashes, clinkers, &c., that are not consumed are blown downward and drop through the grate-bar spaces into the ash-pit below. To insure a still more perfect combustion, I use hollow grate-bars having suitable perforations, through which air, previously heated, is forced out, and, coming in intimate contact with unconsumed products from the generator, such heated air at this place will cause complete combustion of such unconsumed products, and consequently produce increased heat in the ash-pit or combustion-chamber below the grate. The steam has also been usually forced upward through the fuel for decomposition in the same direction as the air-blast; but I reverse the direction of the steam—that is, after forcing the air-blast down into the fuel and raising it to the proper heat, I then force the steam down into the fuel, causing its decomposition, and pass the resulting gases through the grate-spaces into the ash-pit, where the hydrocarbons are added and afterward passing the carbureted gases through the regenerator, where a fixed gas is produced, which is passed through the cooler and scrubber to the holder, as usual. By this method no condensation of the steam takes place, as throughout its course it meets with increasing temperature until fully decomposed, and the resulting fixed gas reaches the cooler, and thus a greater supply of gas is obtained with a reduced amount of fuel and hydrocarbons.

An additional advantage of blasting downward through the fuel is that the generator is thereby made coolest at the top, and consequently can be easily cleaned of clinker and the coal introduced at the top without inconvenience to the operators.

My improved process of manufacturing gas may be carried out by the apparatus illustrated in the accompanying drawings, in which—

Figure 1 represents a longitudinal vertical section of the improved apparatus. Fig. 2 represents a horizontal section of the same on the line A B, Fig. 1. Fig. 3 represents a vertical longitudinal section of the apparatus in modified form.

Similar letters refer to like parts in the several figures of the drawings.

The generating-cupola $a$ is constructed of brick with a lining of fire-brick and may be provided with a tight external iron jacket. It has hollow perforated grate-bars $b$, which separate the fuel-chamber from the ash-pit $k$. A passage, $k'$, serves for the removal of ashes and clinkers from the ash-pit, and is provided with a tight-fitting lid, $k''$. A branch air-blast pipe, $b'$, having valve $b''$, connects with the hollow perforated grate and other branch pipes, $e$, having valve $e'$, and $d$, having valve $d'$, connect, respectively, with the side and upper portion of the generator-chamber, and these branch pipes connect with the vertical blast-pipe $c'$, connecting at the lower end with pipe $c$, leading from the blower C. A branch pipe, $c''$, connects pipe $c$ with passage $k^3$, leading from the ash-pit into the fixing and superheating chamber M, commonly called the "regenerator." Pipe $c$ is provided with controlling-valve $c^3$. Hot air is supplied to the blower, as hereinafter more fully explained. Just above the grate-bars openings $f\ f$ are formed in the wall, and are closed externally with tight-fitting lids $f'$. A fuel-opening, $g$, having a tight-fitting lid, $g'$, is provided in the top of the generator. Through this opening the fuel may be stoked, and clinkers which may adhere to the side walls be removed by suitable bars. Fuel-hoppers $h\ h$ connect by means of passages $h^3\ h^3$ with the interior of the furnace, and such hoppers are provided with rotary stirrers $h''\ h''$, located at their lower contracted ends, and with tight-fitting removable covers $h'$ at the top. The take-off pipe $i'$, having valve $i''$ for fuel-gas, connects by means of passage $i$ with the upper part of the generator. A branch steam-supply pipe, $l^5$, having valve $l^7$, connects by passage $l^6$ with the top of the furnace, and another branch steam-pipe connects by passage $l^3$ with the generating and fuel chamber for a short distance above the grate. The branch steam-pipes connect with pipe $l''$, which is connected by pipe $l$ with the steam-dome $L''$ of steam-boiler L. A valve, $l^4$, in pipe $l''$, controls the flow of steam through passage $l^3$. The regenerator M, which serves as a superheater for steam and as a fixing-chamber for carbureted water-gas, is built of brick, and as a continuation of the walls of the generator $a$ being preferably connected with the base of the generator through the medium of the ash-pit and passage $k^3$, as shown in Figs. 1 and 2, it extends horizontally from the ash-pit, and is provided with a series of check-walls, $m\ m$, projecting alternately from the opposite side walls nearly across the chamber and forming a tortuous passage, M', through which the gases are passed and brought into intimate contact with the heated check-walls and thereby fixed. Opposite to the apex of each check-wall $m$ is an opening in the wall of the regenerator, which opening is ordinarily closed by loose bricks $m'$ and a tight-fitting cover, $m''$, on the outside of the wall, as shown in Fig. 2, by which arrangement the regenerator is made easy of access, and can be readily cleaned and repaired without letting down the heat, simply by removing the covers $m''$ and bricks $m'$ and introducing a suitable scraper-tool through the openings. One or more of the check-walls nearest to the ash-pit $k$ are made in the form of hollow retorts $m^3\ m^3$, closed at the outer ends and open at the apex, as shown in Fig. 2. Oil-supply pipes $n$, having valves $n'$, connect with the outer ends of these retorts for the injection of hydrocarbon oil to carburet the water-gas during the manufacture of illuminating-gas. The take-off pipe $o$, for illuminating-gas, connects the rear or further end of the fixing-chamber with the seal-chamber $p$ at the base of the cooler P, and the bent end of pipe O dips down into the sealing-liquid, and overflow-pipe $r$ conducts surplus liquid into trap $r'$. Chamber P serves as a cooler for gas and a heater for air, which is supplied to the generator. It is constructed with a series of tubes, $p'$, extending between tube-sheets at opposite ends for the passage of gas, and has at the top the outlet gas-pipe $p''$. Inlet air-pipes $p^3$ connect just below the upper tube-sheet, admitting air to chamber P around the tubes, and outlet air-pipe B leads from the lower portion of the air-heating chamber to pipe $p^4$, which connects with the blower C. A valve, O', in pipe O, controls the flow of gas to the cooler, and valve or damper $L^5$, in the passage between regenerator M and steam-boiler L, controls the flow of products of combustion from the former to the latter. The steam-boiler is tubular, and may be placed horizontally, as in Fig. 1, or vertically, as in Fig. 3. It has a steam-dome, $L''$, from which extends pipe $l$, supplying the pipes leading into the furnace, as heretofore described, also supplying pipe $q$, having valve $q'$, leading into the rear end of regenerator M. A feed-water heater, $L^6$, is placed above the boiler, and from it extends the smoke-stack $L'$.

In the modification shown in Fig. 3 I have arranged the check-walls $m\ m$ in two sets, one above the other, instead of in one horizontal direction, as shown in Figs. 1 and 2, and thereby save room and make the apparatus more compact.

As shown in Fig. 3, an independent furnace or fire-pot, $L^3$, is located adjacent to the boiler and connected therewith by a passage controlled by a valve or damper, $L^4$. This fire-pot may also be connected with the horizontal boiler shown in Fig. 1. The object of this independent fire-pot is to enable steam to be generated in the boiler when the fire in generator $a$ is low, and the waste heat from the latter is not sufficient to generate the required volume of steam. In such case I close damper $L^5$ and open damper $L^4$, make a fire in the fire-pot $L^3$, and pass the flame and hot products of combustion through the tubes of the boiler, thereby generating the required supply of steam. The independent fire-pot is also to be used while illuminating-gas is being made and passed off through the pipe O and cooler P, and at such time damper $L^5$ is closed and damper $L^4$ opened, for admitting flame and hot products to the boiler from the fire-pot, thus keeping the desired pressure of steam. By this arrangement I dispense with an additional boiler, usually employed during this stage of the operation. As the illuminating-gas on its way to the scrubber, purifier, and holder passes through the cooler P, it heats the air that is drawn through the cooler by the exhauster and blower C, and thus two objects are attained—viz., the cooling of the gas and the heating of the air that is to support combustion in the generator and regenerator.

In the practical working of this my improved gas apparatus I find that by forcing air downward through the coal the ashes are blown downward through the grate-bar spaces into the ash-pit, leaving the whole mass of coal quite porous. At this stage of the operation I prefer to add either carbon, in the form of coal-dust, or pulverized fuel, by feeding the same with the air from the blower through the blast-pipes to the upper, central, or lower part of the generator $a$, and in this manner I am able to utilize a large portion of cheap fuel, which may be fed by air-blasts or steam-jets, as desired. I can use to advantage any kind of fuel—such as coal, lignite, wood, sawdust, shavings, in fact, anything that will burn. Bituminous coal cokes readily and the tar runs down without making a thick coating over the top, as in the case where an upward air-blast is used.

The operation of my improved apparatus for making illuminating-gas is as follows: I first make a fire in generator $a$, and cause the gaseous products thereof to pass downward through the grate-bar spaces into the ash-pit, and thence through regenerator M, thereby heating up the refractory check-walls to a high degree of heat, and the products are then passed through the boiler and out at the stack, the damper $L^5$ for such purpose being opened and damper $O'$ being closed. The heated products of combustion, consisting in part of carbonic oxide, are brought into intimate contact with heated air introduced through either of the air-supply pipes $d\ e\ b'$, or all of them, as may be required, to cause complete combustion of the carbonic oxide, and if any unconsumed gases should pass by the grate-bars I introduce heated air at the entrance to the regenerator through the hot-air branch $c''$. After the fuel and decomposing-chamber and the regenerator have been heated to the desired temperature, the air-blasts are shut off, damper $L^5$ is closed, and valve $O'$, leading to the cooler, is opened and a current of steam is passed from the boiler through inlet $l^6$, and, if desired, also through inlet $l^3$ into and through the incandescent fuel in generator $a$, by which the steam, as it passes downward, is decomposed, resulting in the liberation of hydrocarbon and formation of carbonic oxide. Liquid hydrocarbon is then introduced into one or more of the heated retorts $m^3$, where it is quickly volatilized into a thick vapor, which combines with the hydrogen and carbonic oxide, water-gas coming from the generator forming an illuminating-gas, which as it passes through the heated regenerator is fixed, and this fixed gas is passed thence through the liquid seal, the cooler, scrubber, and purifier on its way to the holder, as usual.

In making fuel or heating gas the operation of heating up the apparatus is the same as that above described, the fuel in the generator being brought to incandescence and the regenerator brought to the proper temperature for superheating steam which is introduced at its rear end through pipe $q$ after damper $L^5$, valve $O'$, and steam and air valves are closed. The steam is passed through the regenerator, where it is highly superheated, and then passes upward through the incandescent fuel in generator $a$, where it is fully decomposed, and the fuel-gas is carried off through outlet-pipe $i$ to the cooler, scrubber, purifier, and holder, as usual. By passing the air-blast down through the fuel and causing combustion of the gaseous products below the grate, the ash-pit is kept hot, so that no condensation can take place there, as occurs when the air-blast is admitted through the ash-pit into the fuel.

The improvements in the apparatus described herein, constituting my invention, are covered by claims in a separate application filed February 2, 1885.

Having described my invention, what I claim, and desire to secure by Letters Patent, is—

1. In the manufacture of gas, the process of coking bituminous coal and heating such coked coal to incandescence for decomposing steam, which consists in passing the air-blast or draft down through the ignited fuel and periodically charging fresh bituminous coal on top of the fuel-body, whereby the ashes and dust are blown down into the ash-pit, leaving the body of the coal porous for the passage of steam and preventing the formation of clinker, and whereby the formation of a tarry coating on top of the fuel is prevented and improved results secured.

2. The process of manufacturing gas, which consists in coking bituminous coal and suitably heating such coked coal by passing the air-blast or draft down through it for keeping it clear of ash and clinker, adding fresh bituminous coal as required, and decomposing steam by passing it through the heated fuel and distilling coal, whereby a mixture of water-gas and carbureted hydrogen is produced.

3. The process of making illuminating-gas by forcing air downward into and through the fuel, thereby better coking it and heating it to the decomposing temperature for steam, causing combustion of the resulting gaseous products in the ash-pit and conducting the hot products through the regenerator and boiler for heating them, then decomposing steam by passing it downward through the fuel and conducting the resulting water-gas through the ash-pit into the regenerator or fixing-chamber, there adding hydrocarbon liquid or vapor and then fixing the gas by passing it in contact with the heated refractory material.

In testimony whereof I affix my signature in presence of two witnesses.

BURDETT LOOMIS.

Witnesses:
JAS. W. HATCH,
ED. B. HATCH.